(12) United States Patent
Ozeki et al.

(10) Patent No.: US 11,600,031 B2
(45) Date of Patent: Mar. 7, 2023

(54) FONT CREATION APPARATUS, FONT CREATION METHOD, AND FONT CREATION PROGRAM

(71) Applicant: FUJIFILM Corporation, Tokyo (JP)

(72) Inventors: Makoto Ozeki, Tokyo (JP); Kazuyuki Itagaki, Kanagawa (JP); Takatoshi Karino, Kanagawa (JP); Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

(21) Appl. No.: 17/198,499

(22) Filed: Mar. 11, 2021

(65) Prior Publication Data

US 2021/0201548 A1  Jul. 1, 2021

Related U.S. Application Data

(63) Continuation of application No. PCT/JP2019/035056, filed on Sep. 5, 2019.

(30) Foreign Application Priority Data

Sep. 20, 2018  (JP) .............................. JP2018-176318

(51) Int. Cl.
*G06T 11/60* (2006.01)
*G06T 7/11* (2017.01)
(Continued)

(52) U.S. Cl.
CPC ............ *G06T 11/60* (2013.01); *G06F 40/109* (2020.01); *G06K 9/6215* (2013.01); *G06T 7/11* (2017.01); *G06V 10/40* (2022.01)

(58) Field of Classification Search
CPC ........... G06T 11/60; G06T 7/11; G06F 40/109
(Continued)

(56) References Cited

U.S. PATENT DOCUMENTS

2014/0289238 A1*  9/2014  Fume ................... G06V 30/268
                                                          707/728
2016/0364607 A1    12/2016  VanBlon et al.
2020/0285916 A1*   9/2020  Wang ..................... G06V 10/40

FOREIGN PATENT DOCUMENTS

JP  H05-265429 A  10/1993
JP  H06-230766 A   8/1994
(Continued)

OTHER PUBLICATIONS

International Search Report issued in PCT/JP2019/035056; dated Dec. 3, 2019.
(Continued)

*Primary Examiner* — Thomas J Lett
(74) *Attorney, Agent, or Firm* — Studebaker & Brackett PC (57) ABSTRACT

There are provided a font creation apparatus, a font creation method, and a font creation program capable of generating, from small-number character images having a desired-to-be-imitated style, a complete font set for any language having the same style as the character images. A feature amount extraction unit (40) receives a character image (32) of a first font having a desired-to-be-imitated style and extracts a first feature amount of the first font of the character image (32). An estimation unit (42) estimates a transformation parameter between the extracted first feature amount and a second feature amount of a reference second font (34). A feature amount generation unit (44) generates a fourth feature amount of a second font set to be created by transforming a third feature amount of a complete reference font set (36) based on the estimated transformation parameter. A font generation unit (46) generates a complete second font set by converting the generated fourth feature amount of the second font set into an image.

16 Claims, 5 Drawing Sheets

(51) Int. Cl.
*G06F 40/109* (2020.01)
*G06K 9/62* (2022.01)
*G06V 10/40* (2022.01)

(58) Field of Classification Search
USPC .......................................................... 345/467
See application file for complete search history.

(56) References Cited

FOREIGN PATENT DOCUMENTS

| | | |
|---|---|---|
| JP | H07-021158 A | 1/1995 |
| JP | 2001-222272 A | 8/2001 |
| JP | 2003-058142 A | 2/2003 |

OTHER PUBLICATIONS

International Preliminary Report On Patentability and Written Opinion issued in PCT/JP2019/035056; dated Mar. 23, 2021.
Azadi et al.: Multi-Content GAN for Few-Shot Font Style Transfer, UC Berkeley, Adobe Research, Internet <URL: https://engineering.columbia.edu/press-releases/changxi-zheng-fontcode>. Dec. 2017, pp. 1-16.
An Office Action; "Decision of Refusal," mailed by the Japanese Patent Office dated Oct. 14, 2022, which corresponds to Japanese Patent Application No. 2020-548320 and is related to U.S. Appl. No. 17/198,499; with English language translation.
An Office Action; "Notice of Reasons for Refusal", mailed by the Japanese Patent Office dated May 16, 2022, which corresponds to Japanese Patent Application No. 2020-548320 and is related to U.S. Appl. No. 17/198,499 with English language translation.

* cited by examiner

FONT CREATION APPARATUS, FONT CREATION METHOD, AND FONT CREATION PROGRAM

CROSS-REFERENCE TO RELATED APPLICATIONS

The present application is a Continuation of PCT International Application No. PCT/JP2019/035056 filed on Sep. 5, 2019 claiming priority under 35 U.S.C § 119(a) to Japanese Patent Application No. 2018-176318 filed on Sep. 20, 2018. Each of the above applications is hereby expressly incorporated by reference, in its entirety, into the present application.

BACKGROUND OF THE INVENTION

1. Field of the Invention

The present invention relates to a font creation apparatus, a font creation method, and a font creation program, and particularly to a technique of creating a complete font set having a desired-to-be-imitated style.

2. Description of the Related Art

JP2003-058142A discloses a handwriting-style character font generation system that extracts displacement of corresponding points by comparing a standard character font with a character font (for example, a handwritten character) which is input as an image, extracts statistical information of the displacement, and generates a handwriting-style character font by changing the standard character font according to the extraction result.

The handwriting-style character font generation system described in JP2003-058142A generates a unique handwriting-style character font of a user by analyzing geometrical displacement between the standard character font and the character font which is input as an image and a size of the handwritten character, registering statistical information of the displacement as a feature amount representing an individuality of a user, and transforming the standard character font into a feature amount representing the individuality of the user.

Further, in "Multi-Content GAN for Few-Shot Font Style Transfer" Samaneh Azadi, Matthew Fisher, Vladimir Kim, Zhaowen Wang, Eli Shechtman, Trevor Darrell UC Berkeley, Adobe Research, Internet <URL: haps://engineering.columbia.edu/press-releases/changxi-zheng-fontcode>, a technique of generating, from small-number (for example, five-character) alphabets having a desired-to-be-imitated style, 26 alphabet characters having a style similar to the style of the small-number alphabets by using generative adversarial networks (GAN) is disclosed.

The GAN includes two networks of a generator and a discriminator. The generator generates data which is the same as training data (alphabets having the desired-to-be-imitated style), and the discriminator identifies whether the data is from training data or whether the data is from a generation model. Learning is performed on the generator and discriminator such that the discriminator cannot identify whether the data is from training data or a generation model (a correct answer rate is 50%). Finally, the generator can generate data which is the same as the training data.

SUMMARY OF THE INVENTION

The handwriting-style character font generation system described in JP2003-058142A generates a unique handwriting-style character font of a user by transforming a standard character font into a feature amount representing the individuality of the user. In this case, the feature amount representing the individuality of the user is obtained by obtaining the corresponding points between the handwritten character font of the user and the corresponding (same-type) standard character font and extracting displacement of the corresponding points. As a result, for example, it is not possible to generate a handwriting-style "Katakana" character font by using the handwritten "Hiragana" of the user.

Further, in the use of the GAN described in "Multi-Content GAN for Few-Shot Font Style Transfer", in a case where a font having a desired-to-be-imitated style is "alphabet", it is not possible to generate a complete font set for "Hiragana", "Katakana", or another language that has a feature of the font having the desired-to-be-imitated style.

The present invention has been made in view of such circumstances, and an object of the present invention is to provide a font creation apparatus, a font creation method, and a font creation program capable of generating, from small-number character images having a desired-to-be-imitated style, a complete font set for any language having the same style as the character images.

To achieve the above object, according to an aspect of the present invention, there is provided a font creation apparatus including: a character image acquisition unit that acquires a character image including some characters of a first font; a feature amount extraction unit that extracts a first feature amount of the first font from the acquired character image; an estimation unit that estimates a transformation parameter between the extracted first feature amount and a second feature amount of a reference second font; a feature amount generation unit that generates a fourth feature amount of a complete second font set by transforming a third feature amount of a complete reference font set based on the estimated transformation parameter; and a font generation unit that generates the second font set by converting the generated fourth feature amount of the second font set into an image.

According to the aspect of the present invention, the character image acquisition unit acquires a character image including some characters of a first font having a desired-to-be-imitated style. The character image may be a character image including one character or a character string image including a plurality of characters. The feature amount extraction unit extracts a first feature amount of the first font from the acquired character image, and the estimation unit estimates a transformation parameter between the extracted first feature amount and a second feature amount of a reference second font. The reference second font is, for example, a general font which is prepared as a computer font.

The feature amount generation unit generates a fourth feature amount of a second font set to be created by transforming a third feature amount of a complete reference font set based on the estimated transformation parameter. The font generation unit generates the second font set by converting the generated fourth feature amount of the second font set into an image. The complete reference font set may be a font set corresponding to any language. Thereby, a complete second font set for any language can be generated.

In the font creation apparatus according to another aspect of the present invention, preferably, the character image acquisition unit includes an image input unit that inputs an image including captured some characters of the first font and a cutout unit that cuts out a character area corresponding to the characters from the input image, and sets an image of the cut-out character area as the character image.

In the font creation apparatus according to still another aspect of the present invention, preferably, the feature amount extraction unit is a first learned model obtained by learning feature amount extraction, and the first learned model receives the acquired character image and outputs the first feature amount of the character image.

In the font creation apparatus according to still another aspect of the present invention, preferably, the feature amount extraction unit includes a reception unit that receives an input from a designer indicating a feature portion of the character image, and extracts the first feature amount from the feature portion of the character image received by the reception unit.

In the font creation apparatus according to still another aspect of the present invention, preferably, the estimation unit estimates the transformation parameter by calculating a distance or a similarity in a feature amount space between the first feature amount and the second feature amount.

In the font creation apparatus according to still another aspect of the present invention, preferably, the estimation unit and the feature amount generation unit are a second learned model, the second learned model is a model for minimizing a distance in a feature amount space between the first feature amount and the second feature amount or a model for maximizing a similarity in a feature amount space between the first feature amount and the second feature amount, and the second learned model generates the fourth feature amount of the second font set in a case where the complete reference font set is input.

In the font creation apparatus according to still another aspect of the present invention, preferably, the font generation unit is a self-encoder that converts the fourth feature amount of the second font set into an image.

In the font creation apparatus according to still another aspect of the present invention, preferably, the font generation unit generates vector data as the second font set.

In the font creation apparatus according to still another aspect of the present invention, preferably, the font generation unit generates raster data as the second font set.

In the font creation apparatus according to still another aspect of the present invention, preferably, the reference font set is a font set having the same type as the first font and having a different style from the first font. For example, in a case where the first font is the alphabet, the reference font set may be the same type of the "alphabet".

In the font creation apparatus according to still another aspect of the present invention, preferably, the reference font set includes two or more types of font sets having different styles from the first font. For example, in a case where the first font is the alphabet, the reference font set may be "Hiragana" and "Katakana", which are different types from the "alphabet".

Further, according to still another aspect of the present invention, there is provided a font creation method including: acquiring a character image including some characters of a first font; extracting a first feature amount of the first font from the acquired character image; estimating a transformation parameter between the extracted first feature amount and a second feature amount of a reference second font; generating a fourth feature amount of a complete second font set by transforming a third feature amount of a complete reference font set based on the estimated transformation parameter; and generating the second font set by converting the generated fourth feature amount of the second font set into an image.

Further, according to still another aspect of the present invention, there is provided a font creation program causing a computer to realize: a function of acquiring a character image including some characters of a first font; a function of extracting a first feature amount of the first font from the acquired character image; a function of estimating a transformation parameter between the extracted first feature amount and a second feature amount of a reference second font; a function of generating a fourth feature amount of a complete second font set by transforming a third feature amount of a complete reference font set based on the estimated transformation parameter; and a function of generating the second font set by converting the generated fourth feature amount of the second font set into an image.

According to the present invention, it is possible to generate, from small-number character images having a desired-to-be-imitated style, a complete font set for any language having the same style as the character images.

DESCRIPTION OF THE PREFERRED EMBODIMENTS

Hereinafter, preferred embodiments of a font creation apparatus, a font creation method, and a font creation program according to the present invention will be described with reference to the accompanying drawings.

[Hardware Configuration of Font Creation Apparatus]

Figure 1:
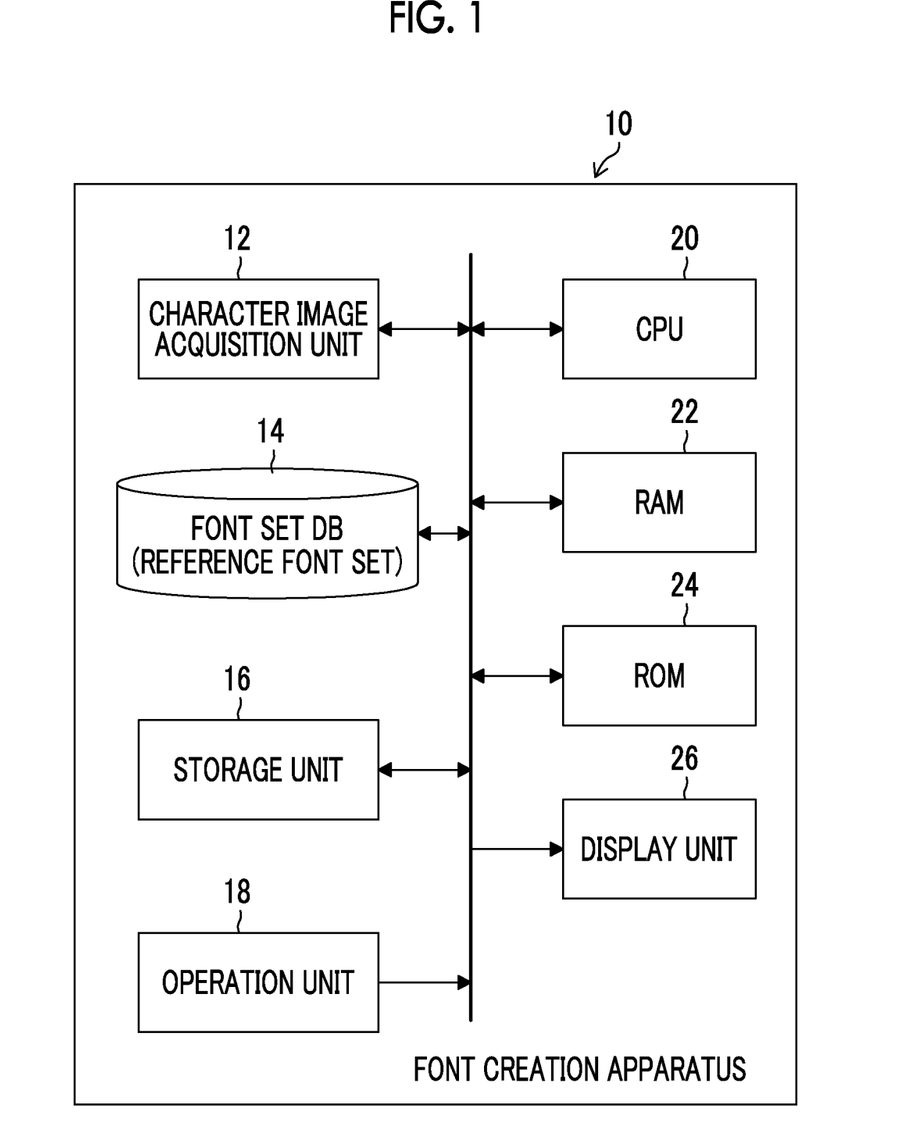
FIG. 1 is a block diagram illustrating an example of a hardware configuration of a font creation apparatus according to the present invention.

FIG. 1 is a block diagram illustrating an example of a hardware configuration of a font creation apparatus according to the present invention.

As the font creation apparatus 10 illustrated in FIG. 1, a personal computer or a workstation may be used. The font creation apparatus 10 of this example mainly includes a character image acquisition unit 12, a font set database (hereinafter, referred to as "font set database (DB))" 14, a storage unit 16, an operation unit 18, and a central processing unit (CPU) 20, a random access memory (RAM) 22, a read only memory (ROM) 24, and a display unit 26.

The character image acquisition unit 12 is a unit that acquires a character image including some characters of a font (first font) having a desired-to-be-imitated style.

Figure 2:
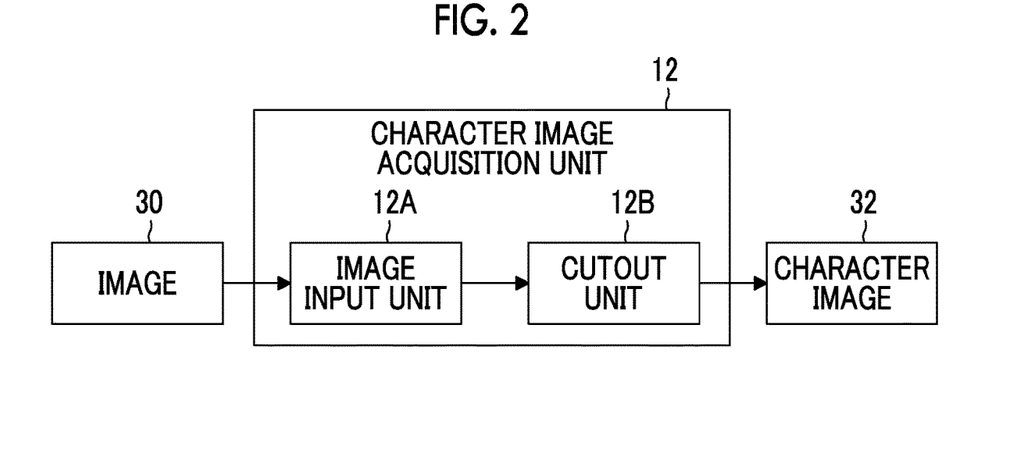
FIG. 2 is a block diagram illustrating an embodiment of a character image acquisition unit 12.

FIG. 2 is a block diagram illustrating an embodiment of the character image acquisition unit 12.

As illustrated in FIG. 2, the character image acquisition unit 12 includes an image input unit 12A and a cutout unit 12B.

An image 30 including a character image of characters having a desired-to-be-imitated style is input to the image input unit 12A. For example, in a case where a user finds a signboard, a poster, a magazine, or the like including characters having a style to be imitated, the user captures an image of the signboard or the like by using a camera, and thus an image 30 including a character image of characters having a desired-to-be-imitated style is acquired. In a case where characters having a style to be imitated are printed on a paper medium such as a magazine, an image 30 including a character image of the characters having the desired-to-be-imitated style may be acquired by reading (imaging) the paper medium by using a scanner. Further, the character image may be a character image including one character or a character string image including a plurality of characters.

The image 30 acquired as described above is input to the image input unit 12A by the user.

The cutout unit 12B cuts out a character area corresponding to a character from the image 30 which is input to the image input unit 12A, and outputs and stores an image (character image) 32 of the cut-out character area in the storage unit 16 or the RAM 22.

The cutout unit 12B may be configured with a machine learning apparatus that recognizes a character area included in an image, or may be a unit that cuts out a character image with support of character image extraction by the user. For example, the image 30 which is input to the image input unit 12A is displayed on the display unit 26, and the user designates a character area included in the image 30 displayed on the display unit 26 by using the operation unit 18 such as a pointing device. Thus, the cutout unit 12B can cut out the character image 32.

The font set DB 14 is a storage unit that stores a reference font set. The reference font set may be, for example, an IPA font. The IPA font is a Japanese outline font, which is a computer font set distributed by Information-technology Promotion Agency (IPA) (Japan) and includes IPA Mincho, IPAP Mincho, IPA Gothic, and IPAP Gothic. The reference font set is not limited to the above example, and may be a font set for any language as long as the font set is a complete font set as a reference.

The storage unit 16 is a storage unit that is configured with a hard disk device, a flash memory, and the like and stores an operating system, various programs including a font creation program according to the present invention, data such as parameters, the character image 32 acquired by the character image acquisition unit 12, a complete font set (second font set) generated by the font creation apparatus 10, and the like.

As the operation unit 18, a keyboard and a mouse that are connected to the computer in a wired manner or a wireless manner may be used. The operation unit 18 receives various operation inputs in font creation.

The CPU 20 reads various programs (including the font creation program according to the present invention) stored in the storage unit 16 or the ROM 24, and executes the various processing. The RAM 22 is used as a work area of the CPU 20, and is also used as a storage unit that temporarily stores the read program and various data.

As the display unit 26, various types of monitors such as a liquid crystal monitor that can be connected to the computer may be used. The display unit 26 is used as a part of a user interface together with the operation unit 18.

In the font creation apparatus 10 with the above configuration, the CPU 20 reads the font creation program stored in the storage unit 16 or the ROM 24 in response to an instruction input from the operation unit 18, and executes the font creation program. Thereby, as will be described, a complete font set having a desired-to-be-imitated style is created.

First Embodiment of Font Creation Apparatus

Figure 3:
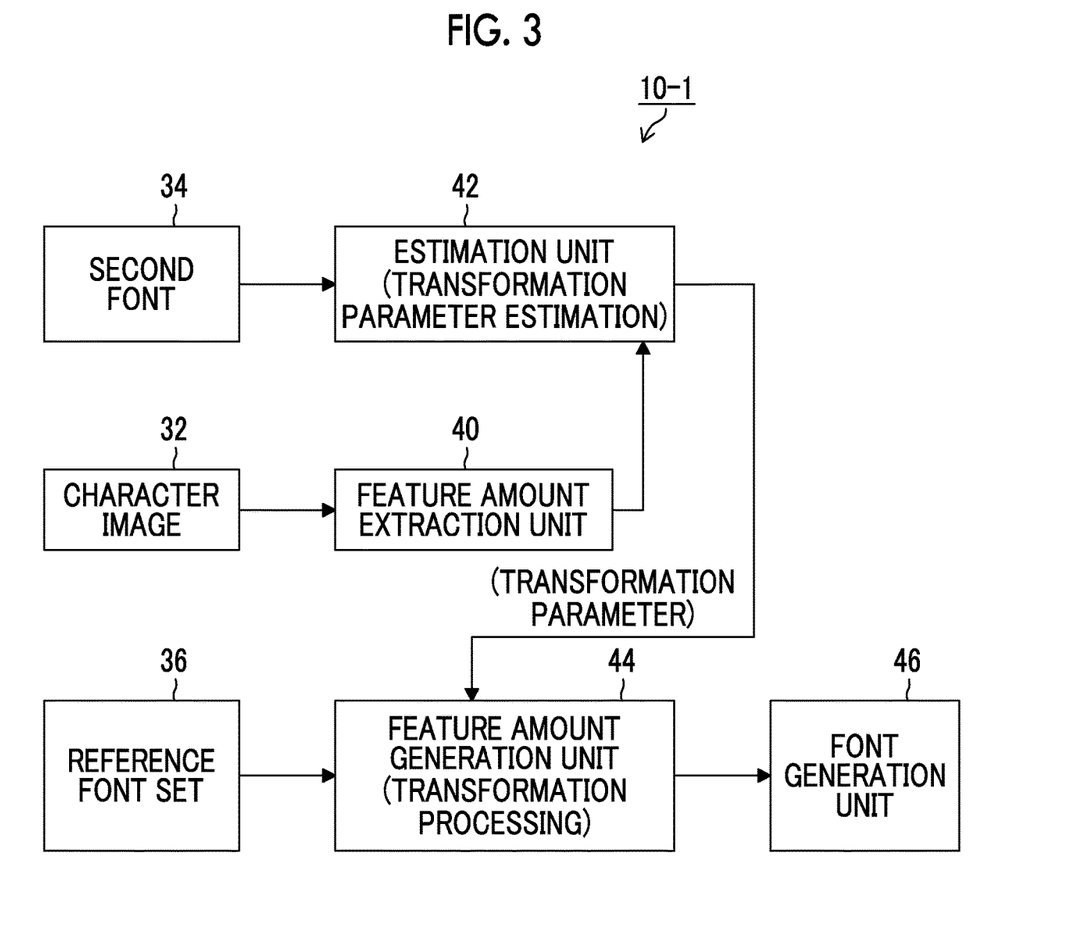
FIG. 3 is a block diagram illustrating a first embodiment of the font creation apparatus 10-1 according to the present invention.

FIG. 3 is a block diagram illustrating a first embodiment of the font creation apparatus 10-1 according to the present invention, and is a functional block diagram illustrating main functions of the font creation apparatus 10 illustrated in FIG. 1.

The font creation apparatus 10-1 illustrated in FIG. 3 mainly includes a feature amount extraction unit 40, an estimation unit 42, a feature amount generation unit 44, and a font generation unit 46.

The character image 32 acquired by the character image acquisition unit 12 (FIG. 2) is input to the feature amount extraction unit 40. The feature amount extraction unit 40 extracts, from the character image 32 which is input, a feature amount (first feature amount) of the font (first font) indicating the style of the character image 32.

In the extraction of the feature amount by the feature amount extraction unit 40, a method of merging feature amounts of the first font indicating the style of the character image 32 (weighting and averaging, and integrating by machine learning), or a method of calculating a feature amount directly from the entire font may be considered. Further, in the extraction of the feature amount by the feature amount extraction unit 40, a method of calculating a feature amount by scoring based on knowledge of a designer or by machine learning, particularly, deep learning may be considered. For example, the feature amount extraction unit 40 may include a reception unit that receives an input of a feature portion by which an impression of the character image 32 is determined in a case where a designer views the character image 32. In this case, a method of extracting a first feature amount from the received feature portion of the character image 32 may be considered. In a case of calculating a feature amount by deep learning, a learned model (first learned model) obtained by learning extraction of the feature amount is used, and the character image 32 is input to the first learned model. Thereby, the first feature amount of the character image 32 is extracted.

The first feature amount of the first font indicating the style of the character image 32 is extracted by the feature amount extraction unit 40, and is output to the estimation unit 42.

The estimation unit 42 is a unit that estimates a transformation parameter between the first feature amount of the first font indicating the style of the character image 32 and a feature amount (second feature amount) of the reference font (second font) 34.

The reference second font 34 can be acquired from the font set DB 14. Here, the reference second font 34 may be some or all fonts of the complete font set stored in the font set DB 14. Further, for example, in a case where the first font is the alphabet, the reference second font may be the alphabet (that is, the same font type), or may be two or more different types of fonts (for example, "Hiragana", "Katakana", "Kanji", and the like).

The estimation unit 42 estimates a transformation parameter between the first feature amount of the first font indicating the style of the character image 32 and the second feature amount of the reference second font 34. The estimated transformation parameter is a parameter for converting the second feature amount of the reference second font 34 into the first feature amount of the first font indicating the style of the character image 32.

Figure 4:
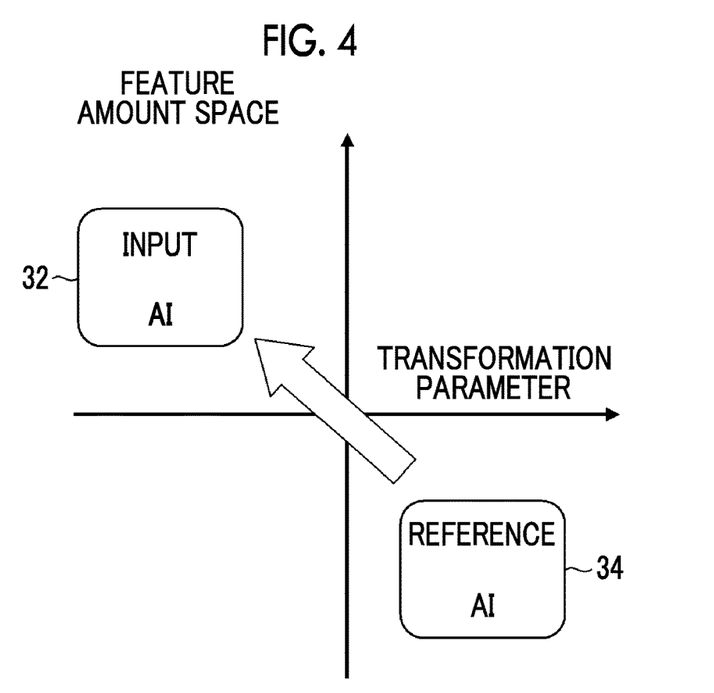
FIG. 4 is a diagram illustrating a first feature amount of a first font indicating a style of a character image 32, a second feature amount of a reference second font 34, and a transformation parameter indicating a relationship between the first feature amount and the second feature amount, in a feature amount space.

FIG. 4 illustrates the first feature amount of the first font ("input AI") indicating the style of the character image 32, the second feature amount of the reference second font 34 ("reference AI"), and the transformation parameter indicating a relationship between the first feature amount and the second feature amount, in a feature amount space.

The estimation unit 42 can estimate the transformation parameter by calculating a distance or a similarity in the feature amount space between the first feature amount and the second feature amount, or can estimate the transformation parameter by machine learning as described later.

Further, the estimation unit 42 receives the second font 34 and extracts the second feature amount of the second font 34 in the same manner as the feature amount extraction unit 40. On the other hand, the second feature amount of the second font may be stored in advance in the font set DB 14 or another storage unit. In this case, the stored second feature amount of the second font may be input to the estimation unit 42.

The transformation parameter estimated by the estimation unit 42 is input to the feature amount generation unit 44.

On the other hand, a complete reference font set 36 is read from the font set DB 14, and a plurality of fonts included in the reference font set 36 are input to the feature amount generation unit 44 one character at a time. Among a plurality of types of reference font sets stored in the font set DB 14 (for example, font sets of the alphabet, Hiragana, Katakana, and Kanji), the user may designate a reference font set which is to be input to the feature amount generation unit 44 by the operation unit 18.

The feature amount generation unit 44 generates a fourth feature amount of the second font set (generated font set) by transforming a feature amount (third feature amount) of the reference font set 36 based on the estimated transformation parameter.

Figure 5:
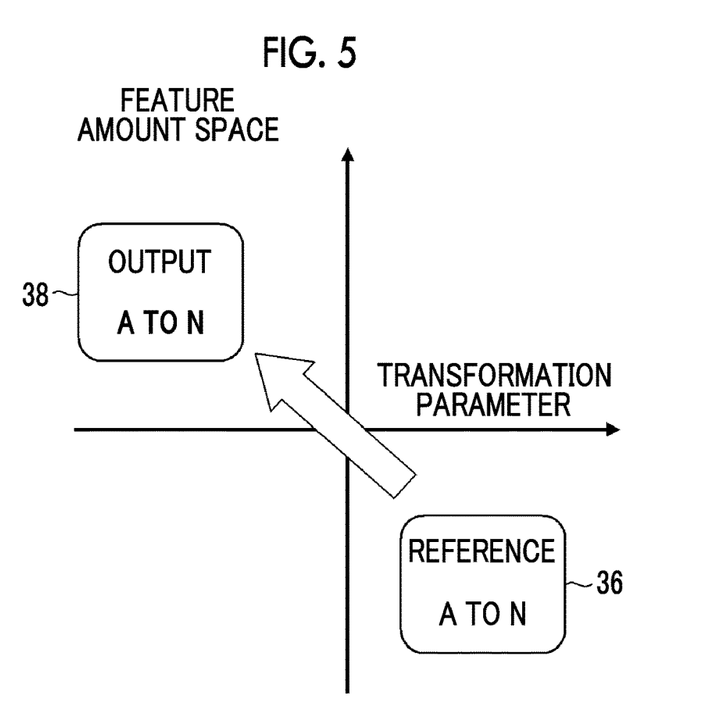
FIG. 5 is a diagram illustrating a case where a third feature amount of a reference font set 36 is transformed into a fourth feature amount of a second font set 38 in a feature amount space by the transformation parameter.

FIG. 5 is a diagram illustrating a case where the third feature amount of the reference font set 36 is transformed into the fourth feature amount of the second font set 38 in the feature amount space by the transformation parameter. In FIG. 5, a case where "A" to "N" of "Hiragana" are selected as a complete reference font set 36 is illustrated.

The third feature amount of the "Hiragana" reference font set 36 is transformed into a fourth feature amount by the feature amount generation unit 44 based on the transformation parameter. That is, the fourth feature amount obtained by transforming the third feature amount becomes the same feature amount as the first feature amount of the first font indicating the desired-to-be-imitated style of the character image 32.

The feature amount generation unit 44 receives the reference font set 36, and extracts the third feature amount of the reference font set 36 in the same manner as the feature amount extraction unit 40. On the other hand, the third feature amount of the reference font set may be stored in advance in the font set DB 14 or another storage unit, and the stored third feature amount of the reference font set may be input.

The fourth feature amount of the second font set obtained by transformation processing by the feature amount generation unit 44 is output to the font generation unit 46.

The font generation unit 46 converts the fourth feature amount of the second font set in the feature amount space into an image in an image space, and generates a complete second font set having the desired-to-be-imitated style of the character image 32.

The font generation unit 46 generates, as a complete second font set, raster data that represents a character image as a set of pixels. On the other hand, the font generation unit 46 may generate vector data that represents a character image by dots, lines, and planes.

The complete second font set generated by the font generation unit 46 is stored in the storage unit 16. Thereby, the user can use the complete second font set, which is stored in the storage unit 16 and has the desired-to-be-imitated style of the character image 32.

Further, in the example illustrated in FIG. 5, a complete reference font set for "Hiragana" is input. On the other hand, the present invention is not limited thereto, and a reference font set for any language may be input. For example, in a case where a complete reference font set for the "alphabet" is input, a complete second font set for the "alphabet" having the desired-to-be-imitated style of the character image 32 may be generated.

Second Embodiment of Font Creation Apparatus

Figure 6:
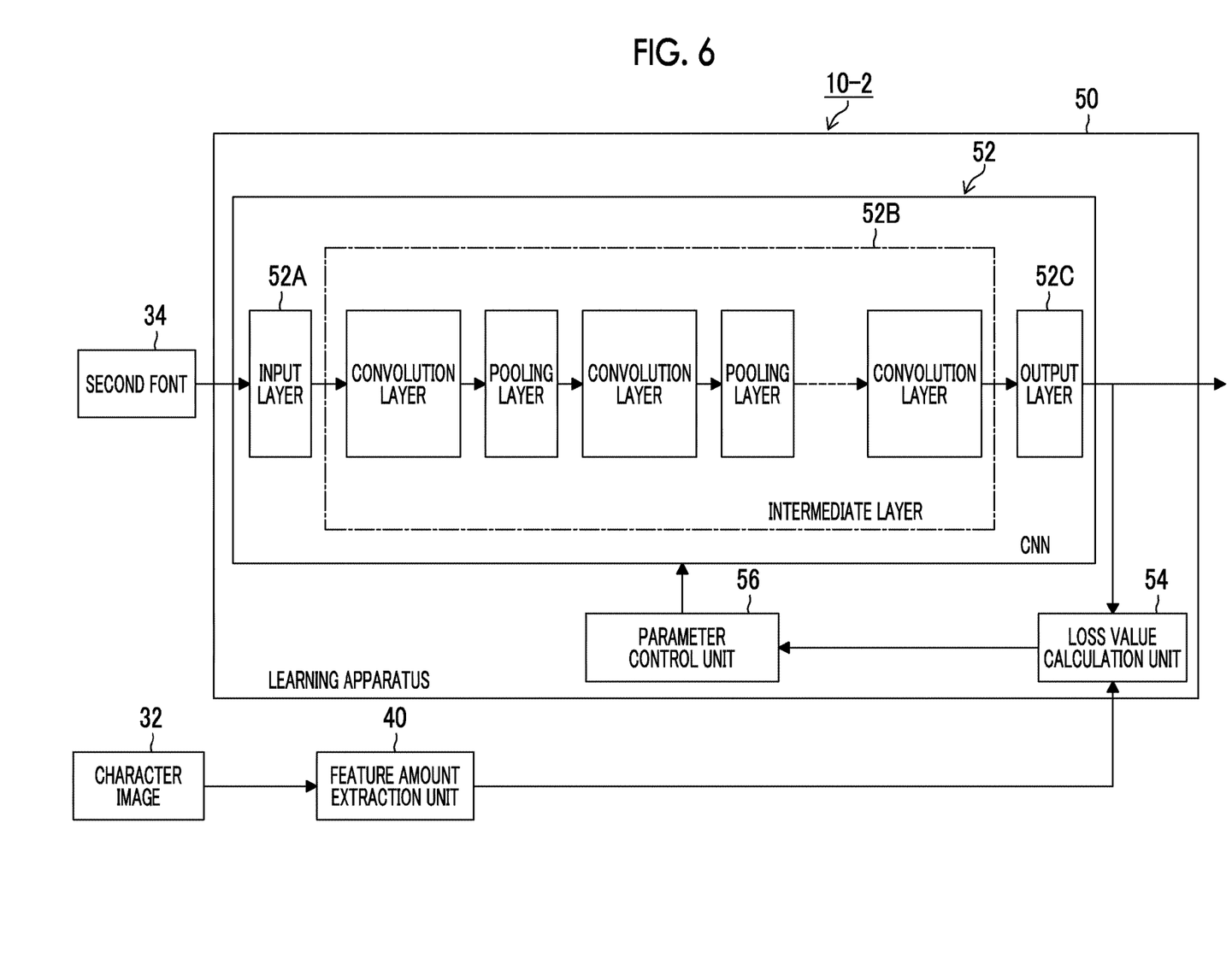
FIG. 6 is a main part block diagram illustrating a second embodiment of the font creation apparatus 10-2 according to the present invention.

FIG. 6 is a main part block diagram illustrating a second embodiment of the font creation apparatus 10-2 according to the present invention, and is a functional block diagram illustrating main functions of the font creation apparatus 10 illustrated in FIG. 1.

The font creation apparatus 10-2 illustrated in FIG. 6 mainly includes a feature amount extraction unit 40 and a learning apparatus 50.

In FIG. 6, the feature amount extraction unit 40 receives the character image 32 in the same manner as the feature amount extraction unit 40 illustrated in FIG. 3, extracts a feature amount of the character image 32, and outputs the extracted feature amount to the learning apparatus 50 (loss value calculation unit 54).

The learning apparatus 50 generates a learned model (second learned model) corresponding to the estimation unit 42 and the feature amount generation unit 44 illustrated in FIG. 3 by performing learning using the character image 32 and the reference second font as learning data. In this example, a convolution neural network (CNN) 52, which is one of deep learning models, is constructed.

The learning apparatus 50 illustrated in FIG. 6 mainly includes a CNN 52, a loss value calculation unit 54, and a parameter control unit 56.

The CNN 52 has a structure including a plurality of layers, and holds a plurality of weight parameters. The CNN 52 can change an unlearned model into a learned model by updating the weight parameter from an initial value to an optimum value. As the initial value of the weight parameter of the CNN 52, for example, a weight parameter of a learned model of an image system that performs image classification may be applied. Accordingly, the CNN 52 is obtained by performing learning in advance, and is a desired learning model obtained by performing learning (fine tuning) with a small amount of learning data.

The CNN 52 includes an input layer 52A, an intermediate layer 52B that includes a plurality of sets each including a convolution layer and a pooling layer, and an output layer 52C. Each layer has a structure in which a plurality of "nodes" are connected to each other by "edges".

The second font 34 to be learned is input to the input layer 52A.

The intermediate layer 52B includes a plurality of sets each including a convolution layer and a pooling layer, and is a portion that extracts a feature from the second font 34 (image) which is input from the input layer 52A. The convolution layer acquires a "feature map" by performing filter processing on a node adjacent to a previous layer (performing a convolution operation using a filter). The pooling layer reduces the feature map which is output from the convolution layer, and sets the reduced feature map as a new feature map. The "convolution layer" serves for feature extraction such as edge extraction from an image, and the "pooling layer" serves to impart robustness to the extracted feature such that the extracted feature is not affected by parallel movement or the like. The intermediate layer 52B is not limited to the case where the convolution layer and the pooling layer are set as one set. For example, a case where the convolution layers are continuously provided may be applied, or a case where a normalization layer is provided may be applied.

The output layer 52C is a portion that outputs a recognition result of the CNN 52 (in this example, a feature map indicating a feature of the font).

The loss value calculation unit 54 acquires the recognition result (feature map), which is output from the output layer 52C of the CNN 52, and the first feature amount (training data) of the first font indicating the desired-to-be-imitated style of the character image 32, and calculates a loss value between the recognition result and the first feature amount. As a method of calculating the loss value, for example, softmax cross entropy, sigmoid, or the like may be used.

The parameter control unit 56 adjusts the weight parameter of the CNN 52 by an error inverse propagation method based on the loss value calculated by the loss value calculation unit 54 such that a distance or a similarity in the feature amount space between the training data (first feature amount) and the output of the CNN 52 (second feature amount) is minimized or maximized.

The parameter adjustment processing is repeatedly performed, and the learning is repeatedly performed until the loss value calculated by the loss value calculation unit 54 converges.

In this way, the weight parameter is optimized. Thus, the learned CNN 52 extracts the second feature amount of the second font 34 based on the optimized weight parameter, and holds the optimized weight parameter as a transformation parameter between the first feature amount of the first font indicating the style of the character image 32 and the second feature amount of the second font 34.

In a case where the reference font set 36 is input as the input image of the learned CNN 52, the learned CNN 52 outputs a fourth feature amount (feature map), which is the same as the first feature amount of the first font indicating the desired-to-be-imitated style of the character image 32, by transforming the third feature amount of the reference font set. The learned CNN 52 functions as the estimation unit 42 and the feature amount generation unit 44 illustrated in FIG. 3.

The fourth feature amount (feature map) of the second font set is output from the learned CNN 52 and is input to the font generation unit 46 (FIG. 3). The font generation unit 46 obtains an image (character image) by converting the fourth feature amount of the second font set in the feature amount space into an image in an image space. The font generation unit 46 may be configured by a self-encoder that converts a feature amount of an image (the fourth feature amount of the second font set) into an image.

[Font Creation Method]

Figure 7:
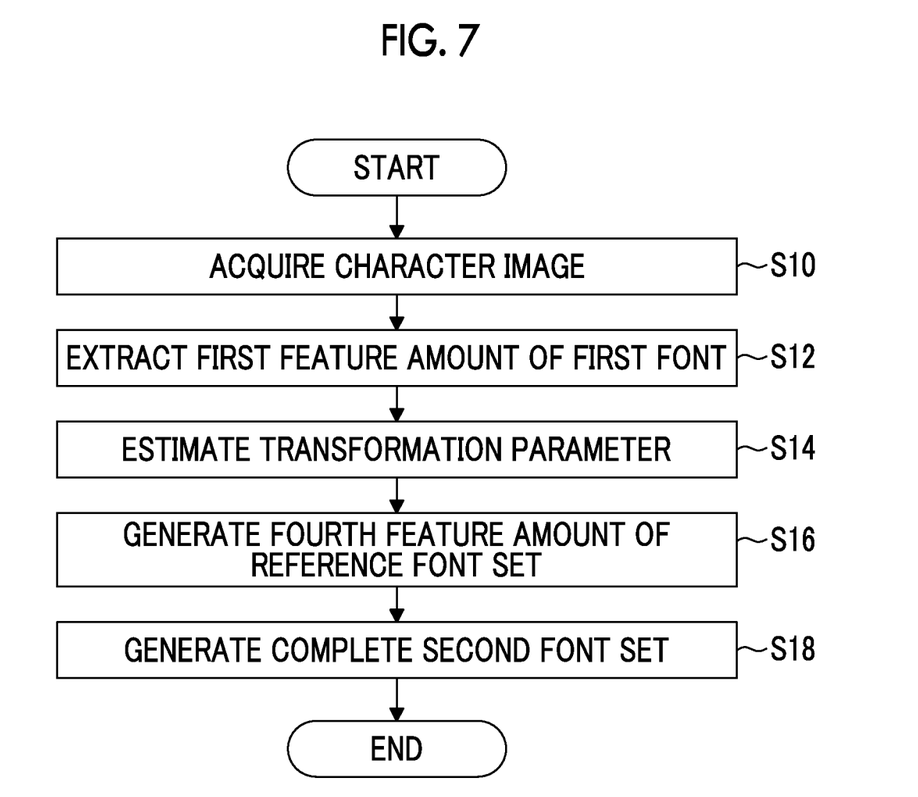
FIG. 7 is a flowchart illustrating an embodiment of a font creation method according to the present invention.

FIG. 7 is a flowchart illustrating an embodiment of a font creation method according to the present invention, and illustrates a processing procedure of each unit of the font creation apparatus 10-1 according to the first embodiment illustrated in FIG. 3.

In FIG. 7, first, the character image acquisition unit 12 (FIG. 2) acquires a character image 32 having a desired-to-be-imitated style (step S10).

The feature amount extraction unit 40 extracts, from the character image 32 acquired in step S10, a first feature amount of the first font indicating the style of the character image 32 (step S12).

Subsequently, the estimation unit 42 estimates a transformation parameter between the first feature amount of the first font indicating the style of the character image 32 and a second feature amount of the reference font (second font) 34 (step S14).

The feature amount generation unit 44 generates a fourth feature amount of the second font set by transforming a third feature amount of the complete reference font set 36, which is read from the font set DB 14, based on the transformation parameter estimated in step S14 (step S16).

The font generation unit 46 converts the fourth feature amount of the second font set in the feature amount space, which is generated in step S16, into an image in an image space, and generates a complete second font set having the desired-to-be-imitated style of the character image 32 (step S18).

[Others]

As a hardware structure for executing various controls of the font creation apparatus 10 according to the present embodiment, the following various processors may be used. The various processors include a central processing unit (CPU) which is a general-purpose processor that functions as various processing units by executing software (program), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs or a combination of a CPU and an FPGA). Further, the plurality of control units may be configured by one processor. As an example in which the plurality of control units are configured by one processor, firstly, as represented by a computer such as a client and a server, a form in which one processor is configured by a combination of one or more CPUs and software and the processor functions as the plurality of control units may be adopted. Secondly, as represented by a system on chip (SoC) or the like, a form in which a processor that realizes the function of the entire system including the plurality of control units by one integrated circuit (IC) chip is used may be adopted. As described above, the various control units are configured by using one or more various processors as a hardware structure.

Further, as the hardware structure of the various processors, more specifically, an electric circuit (circuitry) in which circuit elements such as semiconductor elements are combined may be used.

Further, the present invention includes a font creation program, which is installed in a computer and causes the computer to function as the font creation apparatus according to the present invention, and a recording medium in which the font creation program is recorded.

Further, the present invention is not limited to the embodiment described above, and various modifications may be made without departing from the spirit of the present invention.

EXPLANATION OF REFERENCES

10, 10-1, 10-2: font creation apparatus
12: character image acquisition unit
12A: image input unit
12B: cutout unit
14: font set DB
16: storage unit
18: operation unit
20: CPU
22: RAM
24: ROM
26: display unit
30: image
32: character image
34: second font
36: reference font set
38: second font set
40: feature amount extraction unit
42: estimation unit
44: feature amount generation unit
46: font generation unit
50: learning apparatus
52: convolution neural network (CNN)
52A: input layer
52B: intermediate layer
52C: output layer
54: loss value calculation unit
56: parameter control unit
S10 to S18: step

What is claimed is:

1. A font creation apparatus comprising a processor configured to:
acquire a character image including some characters of a first font;
extract a first feature amount of the first font from the acquired character image;
estimate a transformation parameter between the extracted first feature amount and a second feature amount of a reference second font;
generate a fourth feature amount of a complete second font set by transforming a third feature amount of a complete reference font set based on the estimated transformation parameter; and
generate the second font set by converting the generated fourth feature amount of the second font set into an image.

2. The font creation apparatus according to claim 1, wherein the processor is further configured to:
input an image including captured some characters of the first font;
cut out a character area corresponding to the characters from the input image; and
set an image of the cut-out character area as the character image.

3. The font creation apparatus according to claim 1, wherein
the processor is configured to be a first learned model obtained by learning feature amount extraction, and
the first learned model receives the acquired character image and outputs the first feature amount of the character image.

4. The font creation apparatus according to claim 1, wherein the processor is configured to:
receive an input from a designer indicating a feature portion of the character image; and
extract the first feature amount from the received feature portion of the character image.

5. The font creation apparatus according to claim 1, wherein the processor is configured to estimate the transformation parameter by calculating a distance or a similarity in a feature amount space between the first feature amount and the second feature amount.

6. The font creation apparatus according to claim 1, wherein
the processor is configured to be a second learned model,
the second learned model is a model for minimizing a distance in a feature amount space between the first feature amount and the second feature amount or a model for maximizing a similarity in a feature amount space between the first feature amount and the second feature amount, and
the second learned model generates the fourth feature amount of the second font set in a case where the complete reference font set is input.

7. The font creation apparatus according to claim 1, wherein the processor is configured to convert the fourth feature amount of the second font set into an image.

8. The font creation apparatus according to claim 1, wherein the processor is configured to generate vector data as the second font set.

9. The font creation apparatus according to claim 1, wherein the processor is configured to generate raster data as the second font set.

10. The font creation apparatus according to claim 1, wherein the reference font set is a font set having the same type as the first font and having a different style from the first font.

11. The font creation apparatus according to claim 1, wherein the reference font set includes two or more types of font sets having different styles from the first font.

12. The font creation apparatus according to claim 1, wherein the complete reference font set has a style different from the second font.

13. A font creation method comprising:
acquiring a character image including some characters of a first font;
extracting a first feature amount of the first font from the acquired character image;
estimating a transformation parameter between the extracted first feature amount and a second feature amount of a reference second font;
generating a fourth feature amount of a complete second font set by transforming a third feature amount of a complete reference font set based on the estimated transformation parameter; and
generating the second font set by converting the generated fourth feature amount of the second font set into an image.

14. The font creation method according to claim 13, wherein the complete reference font set has a style different from the second font.

15. A non-transitory computer-readable recording medium causing a computer to execute a font creation function in a case where a command stored in the recording medium is read by the computer, the font creation function comprising:
- a function of acquiring a character image including some characters of a first font;
- a function of extracting a first feature amount of the first font from the acquired character image;
- a function of estimating a transformation parameter between the extracted first feature amount and a second feature amount of a reference second font;
- a function of generating a fourth feature amount of a complete second font set by transforming a third feature amount of a complete reference font set based on the estimated transformation parameter; and
- a function of generating the second font set by converting the generated fourth feature amount of the second font set into an image.

16. The non-transitory computer-readable recording medium according to claim 15, wherein the complete reference font set has a style different from the second font.

\* \* \* \* \*